(12) United States Patent
Weichbrodt et al.

(10) Patent No.: US 9,493,305 B2
(45) Date of Patent: Nov. 15, 2016

(54) CONVEYOR ROLLER WITH REINFORCEMENT ELEMENT

(71) Applicant: INTERROLL Holding AG, S. Antonino (CH)

(72) Inventors: Reinhold Weichbrodt, Wermelskirchen (DE); Georg Malina, Wermelskirchen (DE)

(73) Assignee: INTERROLL HOLDING AG, Sant'Antonino (CH)

( * ) Notice: Subject to any disclaimer, the term of this patent is extended or adjusted under 35 U.S.C. 154(b) by 0 days.

(21) Appl. No.: 14/205,119

(22) Filed: Mar. 11, 2014

(65) Prior Publication Data

US 2014/0251765 A1    Sep. 11, 2014

(30) Foreign Application Priority Data

Mar. 11, 2013   (DE) .................... 20 2013 002 290 U (51) Int. Cl.
  *B65G 13/02*    (2006.01)
  *B65G 39/02*    (2006.01)
  *B65G 39/09*    (2006.01)
(52) U.S. Cl.
  CPC ............... *B65G 13/02* (2013.01); *B65G 39/02* (2013.01); *B65G 39/09* (2013.01); *Y10T 29/49547* (2015.01)
(58) Field of Classification Search
  None
  See application file for complete search history.

(56) References Cited

U.S. PATENT DOCUMENTS

| | | | |
|---|---|---|---|
| 3,037,603 A | 6/1962 | Kornylak | |
| 3,978,974 A * | 9/1976 | Morrissey | B65G 39/02 |
| | | | 193/37 |
| 4,063,636 A | 12/1977 | vom Stein | |
| 5,088,596 A | 2/1992 | Agnoff | |
| 5,092,444 A | 3/1992 | Agnoff | |
| 5,180,344 A | 1/1993 | Hall | |
| 5,209,342 A | 5/1993 | vom Stein | |
| 5,230,418 A | 7/1993 | Agnoff | |
| 5,281,189 A | 1/1994 | Agnoff | |
| 5,421,442 A | 6/1995 | Agnoff | |
| 5,442,248 A | 8/1995 | Agnoff | |
| 6,076,647 A | 6/2000 | Agnoff | |
| 6,124,656 A | 9/2000 | Jensen | |
| 6,286,659 B1 * | 9/2001 | Petrovic | B65G 47/261 |
| | | | 193/37 |

(Continued)

FOREIGN PATENT DOCUMENTS

| CA | 2093554 A1 | 10/1993 |
|---|---|---|
| CA | 2670465 A1 | 5/2008 |

(Continued)

OTHER PUBLICATIONS

German search report mailed Sep. 2, 2013, from Application No. 202013002290.6 (6 pages).

(Continued)

*Primary Examiner* — Kavel Singh
(74) *Attorney, Agent, or Firm* — Kilpatrick Townsend & Stockton LLP (57) ABSTRACT

The invention relates to a conveyor roller for conveyor installations for the purpose of conveying containers, pallets and the like, comprising a roller body with a roller axis, the outer peripheral area of which represents a bearing surface for items to be conveyed, and a head element that is inserted with an insertion section having a cylindrical outer surface into a hollow end of the roller body, whereby the insertion section of the head element has a reinforcement element.

13 Claims, 3 Drawing Sheets

(56) References Cited

U.S. PATENT DOCUMENTS

| | | | |
|---|---|---|---|
| 6,402,653 B1 | 6/2002 | Jensen | |
| 6,502,690 B1 | 1/2003 | Specht | |
| 6,585,107 B1 | 7/2003 | Specht | |
| 6,907,985 B1 | 6/2005 | Axmann | |
| 7,028,825 B2 * | 4/2006 | Scott | B65G 39/09 193/35 B |
| 7,147,596 B2 * | 12/2006 | Reynolds | B65G 39/02 492/39 |
| 7,157,817 B2 | 1/2007 | Hvidberg | |
| 7,207,433 B2 | 4/2007 | Schaefer | |
| 7,318,578 B2 * | 1/2008 | Hvidberg | H01R 13/6315 254/266 |
| 7,954,626 B2 | 6/2011 | Eigenfeld | |
| 8,172,064 B2 | 5/2012 | Weichbrodt | |
| 8,322,519 B2 | 12/2012 | Kuhn | |
| 8,528,727 B2 | 9/2013 | Lindemann | |
| 8,607,965 B2 | 12/2013 | Sejourne | |
| 2004/0108189 A1 * | 6/2004 | Itoh | B65G 13/06 198/780 |
| 2005/0217967 A1 | 10/2005 | Scott | |
| 2009/0045029 A1 | 2/2009 | Deur | |
| 2010/0181170 A1 | 7/2010 | Lindemann | |
| 2011/0062000 A1 | 3/2011 | Yamamoto | |
| 2012/0046784 A1 | 2/2012 | Malina et al. | |
| 2012/0134610 A1 | 5/2012 | Leuver et al. | |
| 2012/0181141 A1 | 7/2012 | Sejourne et al. | |
| 2012/0233679 A1 | 9/2012 | Shedrinsky | |
| 2013/0076201 A1 | 3/2013 | Froebus et al. | |
| 2013/0087433 A1 | 4/2013 | Sejourne | |
| 2013/0105283 A1 | 5/2013 | Dudek et al. | |
| 2013/0248333 A1 | 9/2013 | Wolters et al. | |
| 2013/0334012 A1 | 12/2013 | Lindemann | |

FOREIGN PATENT DOCUMENTS

| | | |
|---|---|---|
| DE | 644290 A | 4/1937 |
| DE | 735959 A | 6/1943 |
| DE | 1078830 A | 3/1960 |
| DE | 1937289 | 6/1970 |
| DE | 7727307 U1 | 1/1978 |
| DE | 29502647 U1 | 2/1995 |
| DE | 202009005878 U1 | 7/2009 |
| DE | 102009044457 B4 | 5/2011 |
| DE | 102010014930 A1 | 10/2011 |
| DE | 202010006851 U1 | 10/2011 |
| EP | 0692440 A1 | 1/1996 |
| EP | 1671901 B1 | 6/2006 |
| EP | 1671901 B1 | 12/2008 |
| EP | 2184836 A1 | 5/2010 |
| EP | 2455307 B1 | 5/2012 |
| GB | 1540442 A | 2/1979 |
| GB | 2261204 A | 5/1993 |
| GB | 2472020 A | 1/2011 |
| WO | 83/00954 A1 | 3/1983 |
| WO | 02/074665 A1 | 9/2002 |
| WO | 2007/112553 A1 | 10/2007 |
| WO | 2009/139068 A1 | 11/2009 |
| WO | 2011/007016 A1 | 1/2011 |
| WO | 2011/036219 A1 | 3/2011 |
| WO | 2012/104092 A1 | 8/2012 |
| WO | 2012/171615 A1 | 12/2012 |
| WO | 2013/053499 A1 | 4/2013 |

OTHER PUBLICATIONS

Extended European Search Report mailed Jun. 26, 2014, from European Application No. 14156957.4 (6 pages).

Office Action mailed Mar. 19, 2015, from Canadian Patent Application No. 2,841,489 (4 pages).

* cited by examiner

CONVEYOR ROLLER WITH REINFORCEMENT ELEMENT

The invention relates to a conveyor roller for conveyor installations for the purpose of conveying containers, pallets and the like, comprising a roller body with a roller axis, the outer peripheral area of which represents a bearing surface for items to be conveyed, and a head element that is inserted with an insertion section having a cylindrical outer surface into a hollow end of the roller body.

The invention further relates to a head element for a conveyor roller for conveyor installations for the purpose of conveying containers, pallets and the like, the head element comprising an insertion section having a cylindrical outer surface, with which the head element can be inserted into a hollow end of a roller body of a conveyor roller.

The invention additionally relates to a method for manufacturing a conveyor roller of the previously described type.

Conveyor rollers of this design are used for various purposes in logistical applications. For example, they can be used in pallet conveying, for the conveyance of packages in parcel distribution centers, for the conveyance of containers in warehouses of various kinds or for baggage transportation in airports, as well as numerous other applications. In the process, a conveyor track is generally constructed which consists of several rollers arranged next to one another, the upper peripheral area of which serves as a mount for the items to be conveyed. In these conveyor tracks, idle rollers which do not have a drive are arranged on one side and are simply rotatably mounted in a conveyor cage. Furthermore, powered conveyor rollers are arranged in these conveyor tracks, said rollers being driven by motor and put into rotation by an electric drive unit. The motor-driven conveyor rollers serve on the one hand to transport the items to be conveyed directly over the outer peripheral area of their roller bodies. On the other hand, through the transmission of the rotation of the motor-driven conveyor roller to one or more idle rollers by means of a transmission element, such as a belt drive, one or more idle rollers can be put into rotation by the motor-driven conveyor roller, in order to also propel the items to be conveyed over their outer peripheral area.

Conveyor rollers are preferably constructed in such a manner that the roller body is designed as hollow, at least in sections, and in particular has a hollow end, preferably two hollow ends. For motor-driven conveyor rollers, the drive unit is preferably arranged inside the interior of the roller body. If the drive unit is arranged inside the roller body, no mechanical components arranged outside the roller body are necessary in order to generate the rotation of the rollers. A drive unit arranged in the interior of the roller body can, for example, have a coupling unit, which is designed and arranged to transmit a torque from the drive unit to an inner peripheral area of the interior of the roller body.

From EP 1 671 901 B1, a conveyor roller is known whereby a head element designed as a bushing is inserted into a hollow end of the roller body and is thereby rigidly connected. The head element designed as a bushing from EP 1 671 901 B1 includes a bearing which is rotatably mounted to a pin of a cage. In this manner, the end of the roller body can be easily rotatably mounted with regard to a cage. So that the head element can be inserted into the hollow end of the roller body, at least in sections, namely its insertion section, the cross-section of the insertion section is preferably adjusted in a plane which is orthogonal to the roller axis of the cross-section of the hollow end of the roller body, which is also in a plane which is orthogonal to the roller axis.

Since the roller body of a conveyor roller, or at least for the most part the hollow end of this roller body, is designed as a hollow cylinder, the insertion section also has a cylindrical outer surface which can be inserted into the end of the roller body. This results in a press fit, so that a transmission of force is generated by means of this press fit between the insertion section and the hollow end of the roller body and thus between the roller body and the head element.

Such existing conveyor rollers are simple to manufacture and install. However, it is desirable to further improve existing conveyor rollers. It is also desirable to further increase the reliability of existing conveyor rollers and/or to further increase the adaptability of conveyor rollers for different areas of application.

It is thus an object of the present invention to provide or manufacture a conveyor roller of the previously mentioned kind which at least partially fulfills one or more of the aforementioned needs. It is furthermore an object of the present invention to provide a head element of the previously mentioned kind which at least partially fulfills one or more of the aforementioned needs.

This object is achieved according to the invention by means of a conveyor roller for conveyor installations for the purpose of conveying containers, pallets and the like, comprising a roller body with a roller axis, the outer peripheral area of which represents a bearing surface for items to be conveyed, and a head element that is inserted with an insertion section having a cylindrical outer surface into a hollow end of the roller body, whereby the insertion section of the head element has a reinforcement element.

The invention is based on the findings that a reliable connection between the head element and roller body is crucial to functionality when it comes to increasing the reliability of conveyor systems. A conveyor system makes use of drive technology, whereby driven conveyor rollers are connected by means of drive belts underneath one another from roller to roller. These drive belts often run over a drive section of the head element, which requires that the roller body of the conveyor roller be connected to the head element in such a manner that a corresponding transmission of force or torque is guaranteed, such as due to a form fit and/or force fit or frictional connection. In particular, for such drive rolls whereby, for example, a 24V DC motor drive unit is installed and, for example, up to 10 conveyor rollers are driven, a reliable connection between the head element and roller body is crucial to the functionality of the conveyor system.

For existing conveyor rollers, this connection is realized by means of a long press fit. This means that the head element has a relatively long insertion section which is pressed deep into a hollow end of the roller body. Such a long press fit can guarantee, in the case of existing conveyor rollers, that even with unfavorable tolerance ratios (large roller body, small head element), a sufficient press fit is still guaranteed. The tolerance zone between the roller body and the head element can amount to 0.2 to 0.4 mm, or partly even up to 0.6 mm.

However, a disadvantage of this construction is that the length of the insertion section of the head element necessary for a sufficient press fit increases the total length of the conveyor roller in the direction of the roller axis, and thus a short design of the conveyor rollers, in particular the motor-driven conveyor rollers, is not possible. In certain areas of application, however, conveyor systems with short conveyor rollers, i.e. with short idle rollers as well as short motor-driven rollers, are necessary or at least advantageous, such as in the transportation of small bundles.

Furthermore, the head element is usually designed in plastic. This relatively soft material—compared to the roller bodies which are for the most part designed in metal, particularly stainless steel—can give way under corresponding pressure, which can reduce the reliability of the connection between the head element and the roller body.

The invention is furthermore based on the findings that the transmission of the rotation from one roller to another, in particular from a motor-driven conveyor roller to one or more idle rollers, can be made possible in a reliable manner even for conveyor rollers with a significantly shorter design if the insertion section of the head element has a reinforcement element. Thus, even for significantly shorter conveyor rollers for which the insertion section of the head element in comparison to existing conveyor rollers is significantly shortened, the reliability of conveyor rollers, both motor-driven conveyor rollers as well as idle rollers, can be improved and, furthermore, the precision of the conveyance of the items to be conveyed, in particular with regard to start and stop, can be increased or ensured, even in the case of conveyor rollers with a shorter design.

In the conveyor roller according to the invention, the insertion section with a cylindrical outer surface has a reinforcement element. This reinforcement element is preferably arranged and designed to improve the transmission of torque between the cylindrical outer surface of the insertion section and the hollow end of the roller body. In particular, the reinforcement element is arranged and designed to increase the rigidity of the insertion section and/or to decrease the deformability of the insertion section. The reinforcement element can preferably increase the stability, in particular the geometric stability, of the head element so that the reliability of the torque transmission is increased.

Since the insertion section has a reinforcement element, the stability of form of the insertion section is increased, so that even for an insertion section that is significantly shortened in comparison to existing conveyor rollers, the required reliable connection between the roller body and head element is ensured. In particular, due to the provision of the reinforcement element, a connection can be ensured which prevents or at least significantly decreases a relative rotational movement and/or a relative axial movement between the head element and roller body. Since the head element has a reinforcement element, the necessary long press fit for existing conveyor rollers can be significantly shortened, since the reinforcement element ensures that the insertion section of the head element is sufficiently rigid even for significantly shorter lengths, and thus, over the entire tolerance range, a reliable transmission of the torque between the roller body and head element can be guaranteed for both the head element as well as the roller body.

In this manner, the provision of a reinforcement element enables a significantly shortened design for conveyor rollers, i.e. both for idle rollers as well as for motor-driven rollers in particular, while at the same time the reliability of these conveyor rollers in comparison with existing conveyor rollers remains the same or can even be increased. As a result, conveyor systems can also be used in areas of application that require significantly shorter lengths in comparison to existing conveyor rollers.

Furthermore, the provision of a reinforcement element can also prevent shrinkage of the head element (in particular head elements designed in plastic) in low-temperature conditions if the reinforcement element is designed with a material that has the same or a similar thermal expansion coefficient as the roller body.

It is preferred that the head element have an inner cavity which in particular is designed to receive bearing elements by means of which the conveyor roller can be mounted to a cage. The insertion section and the reinforcement element also preferably have such an inner cavity. In particular, the inner cavity is designed to receive a roller bearing for the mounting of the bearing pin. The bearing pin can, for example, be formed by a sleeve provided with an inner thread which is mounted to the inner ring of the roller bearing, and a screw that can be screwed into this inner thread.

The conveyor roller can be designed as an idle roller or as a motor-driven conveyor roller. In an embodiment as a motor-driven conveyor roller, the conveyor roller is characterized by a drive unit, which is designed and arranged to transmit a torque to the roller body.

It is particularly preferred that the insertion section and the hollow end of the roller body respectively have a cylindrical cross-section. Cross-section, here, is understood to be a section in a plane which is orthogonal to the roller axis. Particularly if the cylindrical insertion section of the head element is inserted into a hollow end of the roller body with a circular hollow cross-section, it is greatly advantageous if the insertion section has a reinforcement element, in order to create the frictional connection between the cylindrical outer surface of the insertion section and the cylindrical inner area of the hollow end of the roller body in a reliable manner and to maintain this connection throughout the operating period of the conveyor roller. A head element whereby the insertion section has a reinforcement element can prevent or at least reduce or delay the degradation or failure of the frictional connection between the cylindrical outer surface of the insertion section and a cylindrical inner area of the hollow end of the roller body, and thereby counteract the slippage or slackness of the head element with regard to the roller body.

It is particularly preferred that the reinforcement element comprises or consists of a first material, and the head element comprises or consists of a second material, and the first material be a different material from the second material.

It is therefore possible, for example, to design the insertion section in a softer and/or more cost-effective material than the reinforcement element, such as in order to reduce weight and/or cost.

The particular advantages of the head element with an insertion section that has a reinforcement element can in particular be realized if the reinforcement element is designed in a different material from the head element, in particular in a different material from the insertion section of the head element, or has such different material. As a result of the combination of different materials, an increase in the stability of the form of the insertion section due to the reinforcement element can be achieved in the desired advantageous manner. It is particularly preferred that the first material be harder than the second material and/or the first material have a greater rigidity than the second material.

The head element is preferably designed in plastic. In order to bear the pressure, for example, from a beading of the roller body around the head element or from the press fit, it is advantageous to additionally stiffen the head element. Due to the introduction of the reinforcement element, the stability, in particular the geometric stability, of the head element can be increased, increasing the reliability of the torque transmission. Due to the use of the reinforcement element, the deformability of the press fit of the head element can be significantly reduced.

The head element, in particular the insertion section, is preferably manufactured in plastic, in particular a stiff plastic such as polyamide or a comparable plastic. The head element, in particular the insertion section, is preferably not filled or strengthened with fillers such as fibers, particles or the like, in order to achieve favorable wear behavior from the attachment to the drive belt running on a transmission section. However, for existing conveyor rollers, a longer insertion section is necessary to create the necessary long press fit for a reliable connection between the head element and roller body. The reinforcement element of the insertion section can be designed in a significantly harder or stiffer material, since the reinforcement element preferably does not come in contact with a drive belt. The reinforcement element can, for example, also be designed in a reinforced or stiff plastic in comparison to the insertion section.

Therefore, a material combination is particularly preferred whereby the first material is a metal, in particular stainless steel, and the second material is a plastic.

In a further preferred embodiment, the head element is molded onto the reinforcement element. For example, the head element, in particular the insertion section, can be manufactured by the injection molding method and molded onto the reinforcement element, or the reinforcement element can be molded into the insertion section of the head element. For a design of the reinforcement element, such as with a reinforced plastic, a one-piece design can be preferred, with the insertion section of the head element having an adhesive bond between the reinforced plastic of the reinforcement element and a plastic of the insertion section.

A further preferred embodiment provides that the reinforcement element is designed as a reinforcement ring with an inner diameter, an outer diameter and an axial extension. The construction of the reinforcement element as a reinforcement ring has the advantage of a simple geometric design which at the same time has a high degree of rigidity. Embodiments can thereby be preferred for which the inner diameter of the reinforcement element is the same as, larger than or smaller than the inner diameter of the insertion section and/or the outer diameter of the reinforcement element is the same as or smaller than the outer diameter of the insertion section and/or the axial extension of the reinforcement element is the same as, larger than or smaller than an axial extension of the insertion section. The reinforcement ring can thus vary in its size or wall thickness; that is, its extension between its inner and outer diameter, and in its axial extension. The axial extension of the reinforcement ring corresponds to its width in the direction of the roller axis.

An outer ring of a ball bearing or roller bearing can preferably be used as a reinforcement ring. However, the outer ring used as a reinforcement ring preferably has no ball bearing groove in its interior.

It is preferred that the reinforcement element not jut out beyond the cylindrical outer circumference of the insertion section, i.e. that the outer diameter of the reinforcement element correspond at a maximum to the outer diameter of the insertion section. It is furthermore particularly preferred that the reinforcement element be arranged at the insertion section in such a manner that a ring-shaped part of the insertion section surround the outer circumference of the reinforcement element.

A preferred embodiment results if the axial extension of the reinforcement ring amounts to a minimum of double a thickness of the reinforcement ring between its inner and outer diameter. Due to such embodiment of the reinforcement ring with a long width, relative to its thickness, along the roller axis, which preferably is adapted to the insertion section's axial extension, which is shorter in comparison to existing conveyor rollers, it can be achieved that the insertion section be essentially reinforced by the reinforcement ring along its entire axial extension, i.e. over its length in the direction of the roller axis. As a result of this shorter insertion section length in comparison to existing conveyor rollers, it is advantageous if a large part of the insertion section is reinforced by the reinforcement element, which can be guaranteed in the case of a design of the reinforcement element as a reinforcement ring with a corresponding length in the direction of the roller axis.

Alternatively, the thickness of the reinforcement ring between its inner and outer diameter can also amount to a minimum of double the axial extension of the reinforcement ring. In such an embodiment, the reinforcement ring can take on the form of a punched disk or a disk with a central recess.

Furthermore, an embodiment is preferred whereby a thickness of the reinforcement ring is varied between its inner and outer diameters along the axial extension. This can, for example, be realized by means of crimps or swells on the outer and/or inner jacket surfaces of the reinforcement ring. The goals of such embodiments can be to improve the rigidity of the reinforcement ring and/or to save material.

It is furthermore particularly preferred that the size or wall thickness, i.e. the extension between the inner and outer diameter, of the reinforcement ring be greater than the size or wall thickness of the roller body. A balance of forces can hereby be advantageously achieved, such as between a beading pressure applied by a beading and the rigidity of the reinforcement ring.

It is furthermore preferred that the head element have a transmission section for transmitting a torque to a transmission element. The advantages of the invention become particularly useful if the rotation of the roller body is to be transmitted via the head element to one or more other rollers. In this regard, the head element preferably has a transmission section which is not inserted into the roller body, but rather juts out beyond the roller body in an axial direction. A belt drive can be arranged, (at this transmission section, for example), which, for example, connects a motor-driven conveyor roller with directly or indirectly neighboring idle rollers in the conveying and/or opposite direction.

It is particularly preferred that the insertion section tapers at the end that is facing the transmission section. It is thereby furthermore particularly preferred that the end of the roller body has a beading. Further particular advantages result if the beading of the roller body engages with the tapered end of the insertion section.

The insertion section is preferably inserted into the hollow end of the roller body up to its end that is facing the transmission section. The tapering of the insertion section at its end that is facing the transmission section makes it possible for the end of the roller body to have a beading which engages with the tapered end of the insertion section.

The beading can also refer to a circumferential formation on the hollow end of the roller body at the insertion section. Such a beading preferably corresponds to the contraction of the end of the roller body by an amount that corresponds to the tapering at the end of the insertion section. In this manner, a form fit can be achieved between the end of the roller body and the end of the insertion section facing the transmission section, whereby in particular an axial relative movement between the head element and the roller body can be prevented or at least significantly reduced, in particular if said beading is provided at both ends of the roller body. The effectiveness of such a beading, however, is dependent on the rigidity of the material of the head element, in particular the insertion section, since this material must be able to apply a corresponding counteracting force. In particular, the combination of a shortened insertion section with a reinforcement element and a tapered end of the insertion section with which a contracting end of the roller body, in the sense of a beading, engages, leads particularly to a favorable connection between the head element and roller body, as a result of which the relative movement in an axial direction and/or in the rotational direction around the roller axis can be prevented or at least reduced.

Furthermore, it is particularly preferred that the reinforcement element be arranged between an end of the insertion section that is facing the transmission section and an end that is facing away from the transmission section.

In this embodiment, the reinforcement element is arranged at the insertion section from the perspective of an axial direction in such a manner that the reinforcement element is arranged between an end of the insertion section that is facing the transmission section and one that is facing away from the insertion section, that is, facing the inside of the roller body.

A preferred embodiment can also result in that an end, facing the inside of the roller body in the assembled state of the head element, that is, an end facing away from the transmission section, of the insertion section and an end, facing the inside of the roller body, of the reinforcement element with regard to the roller axis of the roller body, i.e. in the axial direction, are flush.

It is furthermore preferred that the reinforcement element be arranged at the insertion section in a manner such that in the assembled condition in which the insertion section is inserted into the hollow end of the roller body, only the insertion section or a part of the insertion section, but not the reinforcement element, comes into contact with the inner jacket surface of the hollow roller body.

It is particularly preferred that the transmission section in its outer circumference have at least a W-shaped circumferential profile in order to be able to receive a transmission element designed as a poly-V-belt. In this manner, such a poly-V-belt can be mounted over the circumferential profile of the transmission section and the conveyor roller can be connected with other conveyor rollers in this manner. It is particularly preferred that the transmission section in its outer circumference have a circumferential profile with a double-W form in order to be able to receive two transmission elements designed as poly-V-belts. It is further preferred that the transmission section in its outer circumference have a multiple-V circumferential profile in order to be able to receive one or more transmission elements designed as poly-V-belts.

Such poly-V-belts can be obtained, for example, from the company Hutchinson. Instead of a W-profile, a multiple-V profile can also be constructed at the circumference of the transmission section in order to be able to receive poly-V-belts with more than two V-shaped inner wedges. The poly-V-belts have an enlarged contact surface in comparison to conventional belts. This allows for the transmission of greater torques. The transmission of greater torques, however, hastens the failure of the frictional connection between the head element, in particular the insertion section, and the roller body. In order to reliably realize a greater transmission of torque, it is thus necessary to ensure a torque-resistant connection between the head element and the hollow end of the conveyor roller for correspondingly high torques. Particularly for motor-driven conveyor rollers with a shorter construction length, the provision of a reinforcement ring is thus advantageous in order to be able to reliably ensure the necessary torque transmission for a corresponding short insertion section.

According to a further aspect of the invention, the object mentioned above is achieved by means of a head element for a conveyor roller for conveyor installations for the purpose of conveying containers, pallets and the like, the head element comprising an insertion section having a cylindrical outer surface, with which the head element can be inserted into a hollow end of a roller body of a conveyor roller, whereby the insertion section of the head element has a reinforcement element.

According to a further aspect of the invention, the object mentioned above is achieved by means of a method for manufacturing a conveyor roller for conveyor installations for the purpose of conveying containers, pallets and the like, in particular a conveyor roller as described above, comprising the steps of: provision of a roller body with a roller axis, the outer peripheral area of which represents a bearing surface for items to be conveyed; provision of a head element with an insertion section having a cylindrical outer surface for insertion into a hollow end of the roller body, whereby the insertion section of the head element has a reinforcement element; and, insertion of the insertion section of the head element with the reinforcement element into the hollow end of the roller body.

With regard to the advantages, embodiment variations and embodiment details of the head element according to the invention and the method according to the invention as well as the respective further embodiments, reference is made to the above description regarding the corresponding features of the conveyor roller according to the invention.

A preferred embodiment of the invention is described as an example based on the attached figures. The following is shown in.

Figure 1:
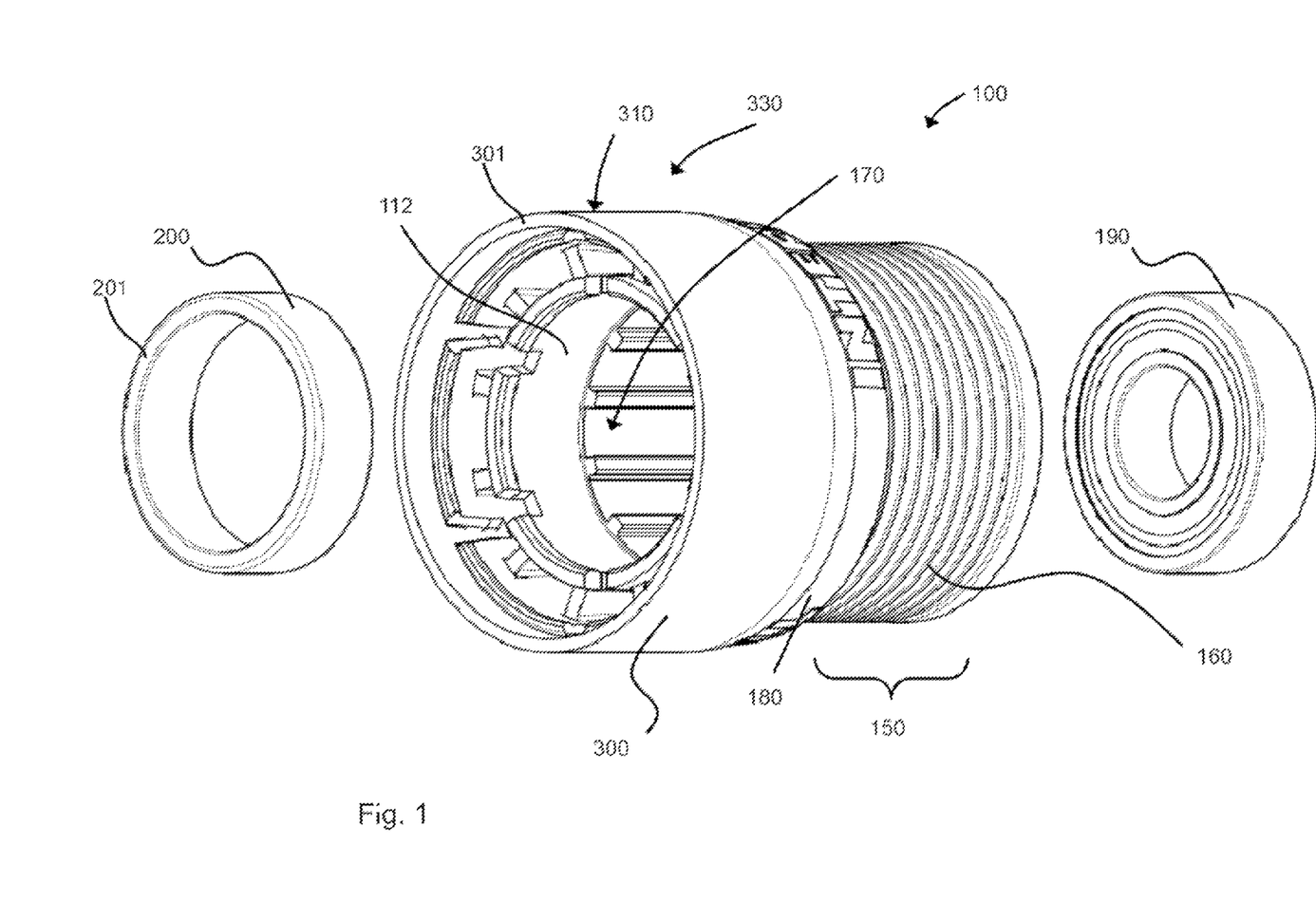
FIG. 1: a three-dimensional exploded view of a head element for a conveyor roller.
Figure 2:
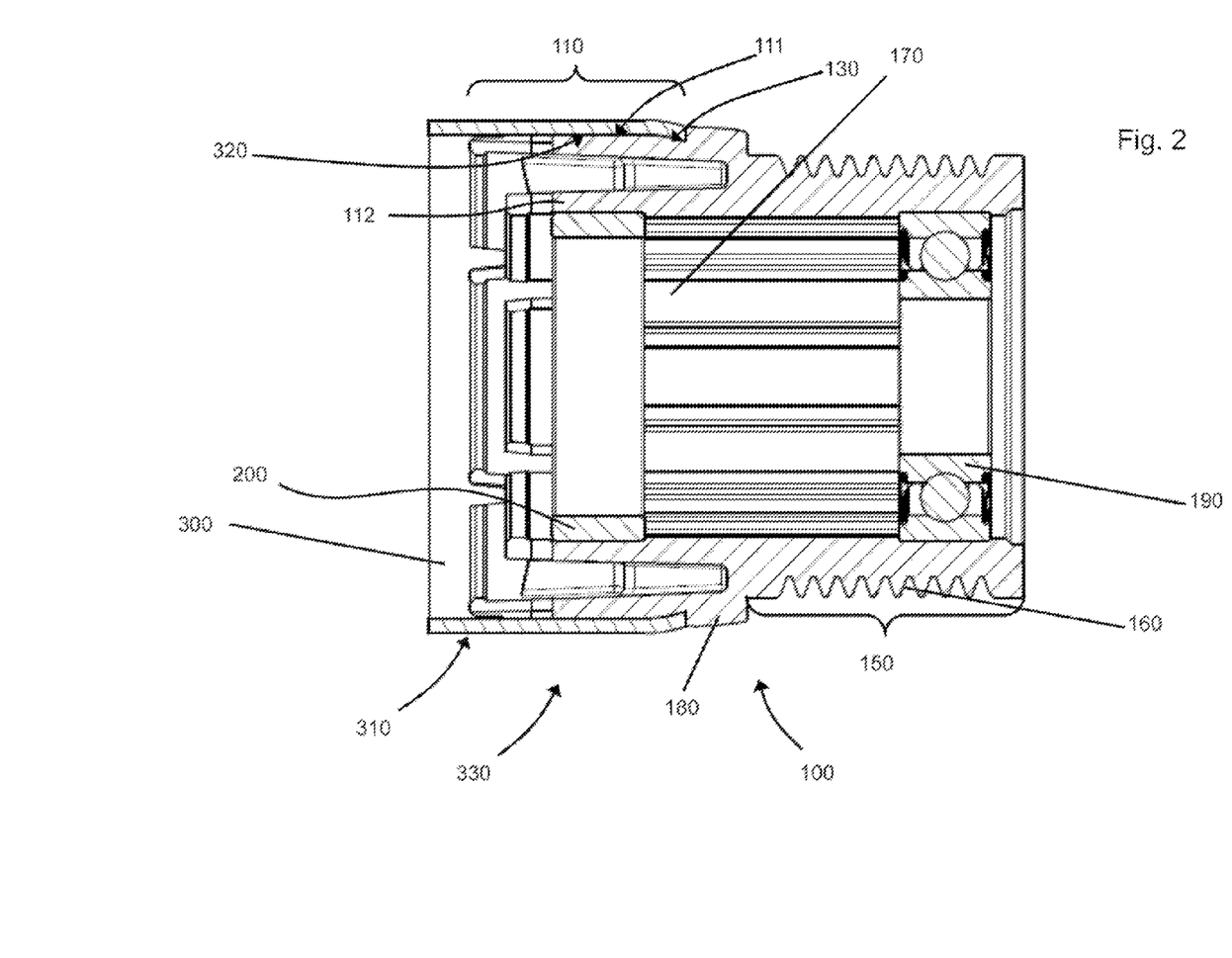
FIG. 2: a longitudinal cross-section through the head element according to FIG. 1.
Figure 3:
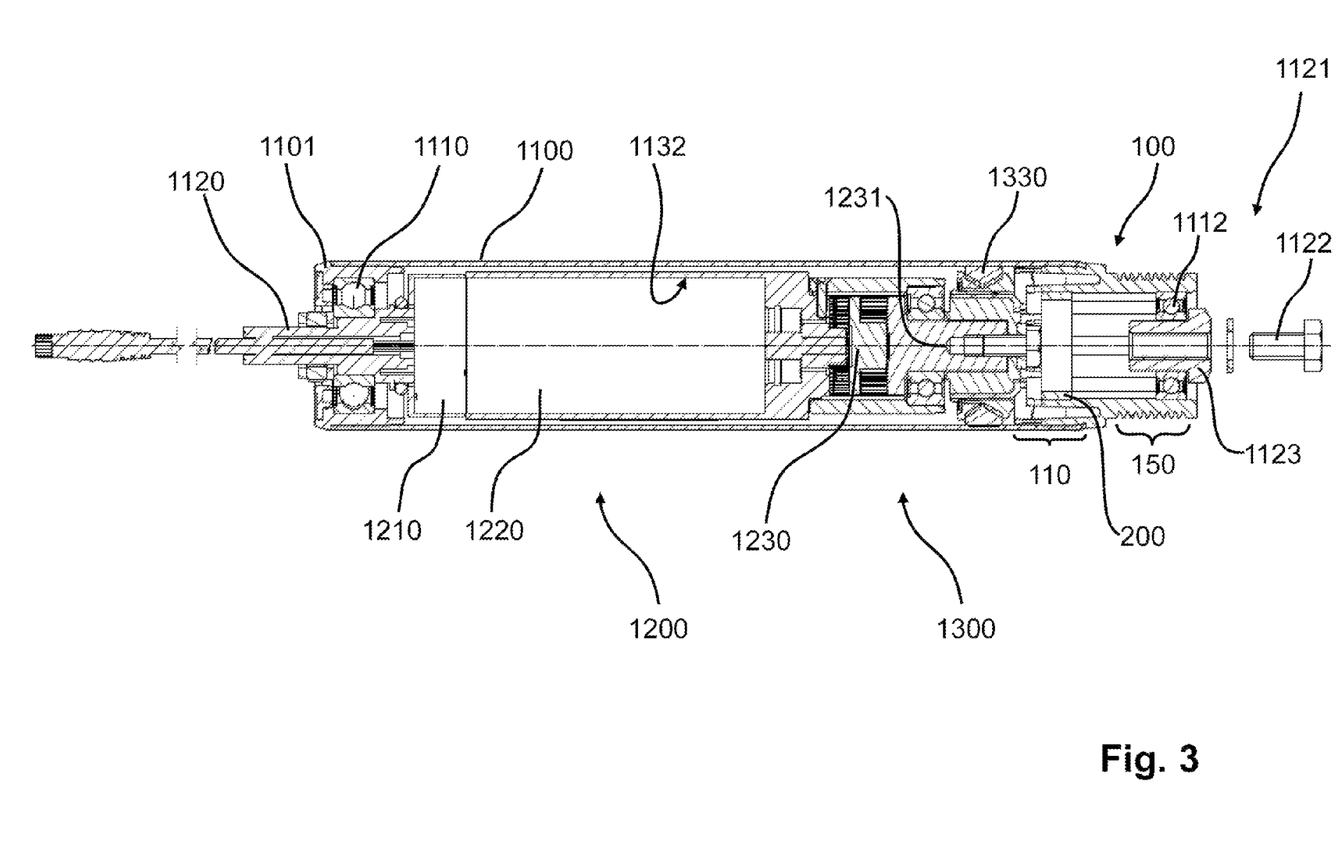
FIG. 3: a longitudinal cross-sectional view of a conveyor roller with a head element.

The head element 100 represented in FIGS. 1 to 3 has an insertion section 110 for insertion into a hollow end 330 of a roller body 300. Head element 100 preferably comprises or consists of plastic, for example polyamide. The outer cylindrical circumference 111 of insertion section 110 of head element 100 is preferably designed as the same or slightly larger than the inner circumference 320 of the hollow end 330 of the roller body, so that a frictional connection arises when insertion section 110 is inserted into the hollow end 330 of roller body 300. The outer peripheral area 310 of the roller body 300 represents a bearing surface for items to be conveyed.

Head element 100 has an inner cavity 170, which is designed, for example, to receive bearing elements for the rotatable mounting of head element 100. Such bearing elements can for example comprise a roller bearing 190 for the mounting of a bearing pin. The bearing pin is for example formed by a sleeve provided with an inner thread which is mounted to the inner ring of the roller bearing, and a screw that can be screwed into this inner thread. A supporting disk can be arranged between the sleeve and the screw. With such a roller bearing mount, the conveyor roller can be rotatably mounted to a cage via head element 100.

The conveyor roller can also fundamentally be mounted in another manner than in a cage with a sleeve and a screw inserted therein. So, for example, an embodiment where a threadless bearing pin is used for attachment can also be advantageous. This bearing pin can for example be attached to the conveyor roller so that it shifts particularly in the longitudinal direction of the roller and is outwardly prestressed by means of a spring, in order to effect a simple and fast assembly of the conveyor roller. In a corresponding manner, another constructive embodiment can be provided on the other side of the conveyor roller, in particular a bearing pin with a non-cylindrical circumferential surface, for example a square or hexagon, for a torque-resistant mounting of the conveyor roller into a correspondingly non-cylindrical opening in the cage.

Insertion section 110 has a cylindrical cross-section in a plane which is orthogonal to the roller axis, in particular a hollow cylinder cross-section. Head element 100 has, in addition to insertion section 110, a transmission section 150 for transmitting the rotation of the roller body to one or more other conveyor rollers. Transmission section 150 additionally has a multiple-V profile 160 at its outer circumference, which can receive one or more poly-V-belts (not pictured). A transition piece 180 is arranged between insertion section 110 and transmission section 150. Insertion section 110 tapers at its end 130 that is facing transmission section 150. Insertion section 110 is inserted up to this end 130 into the hollow end 330 of roller body 300. As shown in FIG. 1, the end of roller body 300 in the area 130 of head element 100 is then molded or crimped onto this tapered end 130 of insertion section 110. This results in a form fit between the insertion section of the head element and the hollow end 330 of roller body 300, which in particular prevents or reduces a relative axial movement between the roller body and the head element.

The size or wall thickness 201 of reinforcement ring 200 is greater than the size or wall thickness 301 of roller body 300. Between the hollow end 330 of roller body 300 and reinforcement ring 200, there is a ring-shaped part 112 of insertion section 110, which surrounds the outer circumference of reinforcement ring 200.

A second bearing can be placed in the inwardly lying end region of the head element, which is necessary in particular if the bearing pin is affixed to the cage in a manner that is not resistant to tipping, such as in the case of a pin that shifts axially and is supplied with a spring for easier and faster assembly of the conveyor roller, such as the aforementioned hexagonal pin.

FIG. 3 shows the basic construction of a conveyor roller, which here is designed as a motor-driven conveyor roller. In a roller body 1100 at a first end, an end cap 1101 permanently connected to the roller body is installed, inside of which a roller bearing 1110 is arranged. The roller bearing 1110 serves for the rotatable mounting of a bearing pin 1120. Bearing pin 1120 is provided with an outer thread at an outwardly pointing end, onto which a nut is screwed and by means of which the bearing pin can be attached in a torque-resistant manner in an opening of a cage, in that the cage is clamped between the nut and a sleeve fastened on the thread inwardly from the nut.

Roller body 1100 has an inner peripheral area 1132, which radially borders an interior of the roller body.

Bearing pin 1120 is designed as hollow, and supply and control lines are run through the inner hole of bearing pin 1120 to a drive unit 1200. Drive unit 1200 is arranged inside roller body 1100 and is attached to bearing pin 1120 in a torque-resistant manner. Drive unit 1200 has control electronics 1210 at its end that is facing bearing pin 1120 for the control of an electrical drive motor 1220, which is preferably designed as a brushless three-phase direct current motor with internal runners. Drive motor 1220 is arranged between control electronics 1210 and a planetary gear 1230 of drive unit 1200, which is arranged at the end of the drive unit that is facing away from bearing pin 1120.

Planetary gear 1230 has a drive shaft 1231 designed with a hexagonal cross-section, which is connected by means of a form fit to a coupling unit 1300 in a torque-resistant manner. Coupling unit 1300 is fastened with pressure ring 1330 to the inner wall of the roller body by means of a frictional connection and transmits the torque from the drive unit and the rotation of the drive shaft to the roller body. As a consequence of this, the roller body rotates with a drive torque relative to the bearing pin and drive unit 1200.

At the end of the roller body that lies opposite bearing pin 1120, a head element 100 is attached to the roller body in a torque-resistant manner. As described above, this head element has, in addition to insertion section 110 with reinforcement ring 200, a transmission section 150 with several W-shaped circumferential grooves, by means of which the rotation and torque of the conveyor roller can be transmitted to neighboring idle rollers. Inside head element 100, there is additionally a roller bearing 1112 arranged for the mounting of a bearing pin 1121 at the end. Bearing pin 1121 is formed by a sleeve 1123 provided with an inner thread which is mounted to the inner ring of roller bearing 1112, and a screw 1122 that can be screwed into this inner thread in order to be able to additionally affix the conveyor to a cage at this end.

The head element 100 that is represented particularly has the following advantages and effects: When pressing head element 100 into the hollow end 330 of roller body 300, the hollow end 330 has a beading at its front end in order to secure head element 100 axially in the hollow end 330 of roller body 300. However, the beading as such does not guarantee a secure transmission of torque, since the surface pressure (inner wall of the hollow end 330 of roller body 300 on the outer press-fit side 111 of head element 100) is influenced not only by the beading, but significantly by the properties of the material of head element 100. Head element 100 is designed in plastic and formed in such a manner that no sufficient counteracting force can be created with regard to the beading. Thus, head element 100 must be additionally reinforced. Due to the insertion of reinforcement ring 200, the counteracting pressure or rigidity, in particular the geometric stability, of head element 100 is increased in that a sufficient counteracting pressure is created, which in turn leads to a sufficient transmission of torque. Due to the use of reinforcement ring 200, the deformability of the press fit of head element 100 is significantly reduced. Since the wall thickness 201 of reinforcement ring 200 is thicker than the wall thickness 301 of the hollow end 330 of roller body 300, a balance of forces results between the beading pressure and the rigidity of reinforcement ring 200. The plastic material 112 of head element 100, which lies in between, has sufficient compression strength to avoid being destroyed between the two metal parts (reinforcement ring 200 and hollow end 330 of roller body 300) and to apply the necessary torque rigidity.

A further advantage is that reinforcement element 200 also prevents the shrinkage of the plastic of head element 100 under low-temperature conditions, since reinforcement ring 200—designed as a metal ring—has the same or a similar thermal expansion coefficient as roller body 300.

The invention claimed is:

1. A conveyor roller for conveyor installations for the purpose of conveying containers, pallets and the like, comprising
   a roller body with a roller axis, the outer peripheral area of which represents a bearing surface for items to be conveyed, and
   a head element, which is inserted with an insertion section having a cylindrical outer surface into a hollow end of the roller body,
   whereby the insertion section of the head element has a reinforcement element,
   wherein the reinforcement element comprises a first material, the head element comprises a second material, and the first material is a different material from the second material, and
   wherein the first material has a higher level of rigidity than the second material.

2. The conveyor roller according to claim 1, wherein the head element is molded onto the reinforcement element.

3. The conveyor roller according to claim 1, wherein the reinforcement element is designed as a reinforcement ring with an inner diameter, an outer diameter and an axial extension.

4. The conveyor roller according to claim 3, wherein a thickness of the reinforcement ring is varied between its inner and outer diameters along the axial extension.

5. The conveyor roller according to claim 1, wherein the head element has a transmission section for transmitting a torque to a transmission element.

6. The conveyor roller according to claim 5, wherein the insertion section tapers at the end that is facing the transmission section.

7. The conveyor roller according to claim 1, wherein the end of the roller body has a beading.

8. The conveyor roller according to claim 7, wherein the beading of the roller body is arranged in the area of an end of the insertion section facing the transmission section.

9. The conveyor roller according to claim 7, wherein the beading of the roller body engages with the tapered end of the insertion section.

10. The conveyor roller according to claim 5, wherein the reinforcement element is arranged between an end of the insertion section that is facing the transmission section and an end that is facing away from the transmission section.

11. The conveyor roller according to claim 1, wherein the reinforcement element is arranged at the insertion section in such a manner that a ring-shaped part of the insertion section surrounds the outer circumference of the reinforcement element.

12. A head element for a conveyor roller for conveyor installations for the purpose of conveying containers, pallets and the like, the head element comprising an insertion section having a cylindrical outer surface, with which the head element can be inserted into a hollow end of a roller body of a conveyor roller, whereby the insertion section of the head element has a reinforcement element, wherein the reinforcement element comprises a first material, the head element comprises a second material, and the first material is a different material from the second material, and wherein the first material has a higher level of rigidity than the second material.

13. A method for manufacturing a conveyor roller for conveyor installations for the purpose of conveying containers, pallets and the like, in particular a conveyor roller, comprising the steps of:
   provision of a roller body with a roller axis, an outer peripheral area of which represents a bearing surface for items to be conveyed,
   provision of a head element with an insertion section having a cylindrical outer surface for insertion into a hollow end of the roller body, whereby the insertion section of the head element has a reinforcement element, wherein the reinforcement element comprises a first material, the head element comprises a second material, and the first material is a different material from the second material, and wherein the first material has a higher level of rigidity than the second material; and
   insertion of the insertion section of the head element with reinforcement element into the hollow end of the roller body.

* * * * *